United States Patent
Acharya et al.

(10) Patent No.: US 7,053,944 B1
(45) Date of Patent: May 30, 2006

(54) METHOD OF USING HUE TO INTERPOLATE COLOR PIXEL SIGNALS

(75) Inventors: Tinku Acharya, Chandler, AZ (US); Ping-Sing Tsai, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 988 days.

(21) Appl. No.: 09/591,867

(22) Filed: Jun. 12, 2000

Related U.S. Application Data

(63) Continuation-in-part of application No. 09/410,800, filed on Oct. 1, 1999.

(51) Int. Cl.
*H04N 5/335* (2006.01)
*H04N 1/46* (2006.01)
*G06K 9/32* (2006.01)

(52) U.S. Cl. ........................ 348/273; 382/300; 358/525

(58) Field of Classification Search ........ 348/273–280, 348/222.1; 382/276, 300; 358/525
See application file for complete search history.

(56) References Cited

U.S. PATENT DOCUMENTS

| | | | | |
|---|---|---|---|---|
| 4,605,956 A | * | 8/1986 | Cok ........................ | 348/273 |
| 4,642,678 A | * | 2/1987 | Cok ........................ | 348/242 |
| 5,014,134 A | | 5/1991 | Lawton et al. | |
| 5,321,776 A | | 6/1994 | Shapiro | |
| 5,373,322 A | * | 12/1994 | Laroche et al. ............. | 348/273 |
| 5,392,255 A | | 2/1995 | LeBras et al. | |
| 5,398,066 A | | 3/1995 | Martinez-Uriegas et al. | |
| 5,491,561 A | | 2/1996 | Fukuda | |
| 5,513,281 A | * | 4/1996 | Yamashita et al. .......... | 382/300 |
| 5,541,653 A | | 7/1996 | Peters et al. | |
| 5,552,827 A | * | 9/1996 | Maenaka et al. ............ | 348/266 |
| 5,602,589 A | | 2/1997 | Vishwanath et al. | |
| 5,629,734 A | * | 5/1997 | Hamilton et al. ........ | 348/222.1 |
| 5,706,220 A | | 1/1998 | Vafai et al. | |
| 5,737,448 A | | 4/1998 | Gardos | |
| 5,875,122 A | | 2/1999 | Acharya | |
| 5,892,847 A | | 4/1999 | Johnson | |
| 5,901,242 A | | 5/1999 | Crane et al. | |
| 5,995,210 A | | 11/1999 | Acharya | |
| 6,009,201 A | | 12/1999 | Acharya | |
| 6,009,206 A | | 12/1999 | Acharya | |
| 6,047,303 A | | 4/2000 | Acharya | |
| 6,091,851 A | | 7/2000 | Acharya | |
| 6,094,508 A | | 7/2000 | Acharya et al. | |

(Continued)

OTHER PUBLICATIONS

U.S. Appl. No. 08/130,243, filed Aug. 6, 1998, Acharya.

(Continued)

*Primary Examiner*—David Ometz
*Assistant Examiner*—Nhan Tran
(74) *Attorney, Agent, or Firm*—Robert D. Hinchliffe

(57) ABSTRACT

Briefly, in accordance with one embodiment of the invention, a method of using hue to interpolate color pixel signals includes the following. For a particular pixel location in a subsampled color image, differences in hue are compared for two mutually orthogonal directions across the particular pixel location. A color signal value for that particular pixel location for a color plane other than the color plane of the pixel signal value in the subsampled color image of that location is computed. The computation includes relatively weighing the differences in hue values, the relative weights depending, at least in part, on the difference in hue value in one direction relative to the other.

20 Claims, 2 Drawing Sheets

| | | $R_{m-2,n}$ | | |
|---|---|---|---|---|
| | | $G_{m-1,n}$ | | |
| $R_{m,n-2}$ | $G_{m,n-1}$ | $R_{m,n}$ | $G_{m,n+1}$ | $R_{m,n+2}$ |
| | | $G_{m+1,n}$ | | |
| | | $R_{m+2,n}$ | | |

U.S. PATENT DOCUMENTS

| | | | |
|---|---|---|---|
| 6,108,453 | A | 8/2000 | Acharya |
| 6,124,811 | A | 9/2000 | Acharya et al. |
| 6,130,960 | A | 10/2000 | Acharya |
| 6,151,069 | A | 11/2000 | Dunton et al. |
| 6,151,415 | A | 11/2000 | Acharya et al. |
| 6,154,493 | A | 11/2000 | Acharya et al. |
| 6,166,664 | A | 12/2000 | Acharya |
| 6,178,269 | B1 | 1/2001 | Acharya |
| 6,195,026 | B1 | 2/2001 | Acharya |
| 6,215,525 | B1 * | 4/2001 | Fujino ................. 382/300 |
| 6,215,908 | B1 | 4/2001 | Pazmino et al. |
| 6,215,916 | B1 | 4/2001 | Acharya |
| 6,229,578 | B1 | 5/2001 | Acharya et al. |
| 6,233,358 | B1 | 5/2001 | Acharya |
| 6,236,433 | B1 | 5/2001 | Acharya et al. |
| 6,236,765 | B1 | 5/2001 | Acharya |
| 6,269,181 | B1 | 7/2001 | Acharya |
| 6,275,206 | B1 | 8/2001 | Tsai et al. |
| 6,285,796 | B1 | 9/2001 | Acharya et al. |
| 6,292,114 | B1 | 9/2001 | Tsai et al. |
| 6,295,087 | B1 * | 9/2001 | Nohda ................. 348/273 |
| 6,301,392 | B1 | 10/2001 | Acharya |
| 6,348,929 | B1 | 2/2002 | Acharya et al. |
| 6,351,265 | B1 * | 2/2002 | Bulman ............... 345/660 |
| 6,351,555 | B1 | 2/2002 | Acharya et al. |
| 6,356,276 | B1 | 3/2002 | Acharya |
| 6,366,692 | B1 | 4/2002 | Acharya |
| 6,366,694 | B1 | 4/2002 | Acharya |
| 6,373,481 | B1 | 4/2002 | Tan et al. |
| 6,377,280 | B1 | 4/2002 | Acharya et al. |
| 6,381,357 | B1 | 4/2002 | Tan et al. |
| 6,392,699 | B1 | 5/2002 | Acharya |
| 6,449,380 | B1 | 9/2002 | Acharya et al. |
| 6,507,364 | B1 * | 1/2003 | Bishay et al. ........ 348/273 |
| 6,535,648 | B1 | 3/2003 | Acharya |
| 6,570,616 | B1 * | 5/2003 | Chen .................. 348/272 |
| 2001/0019630 | A1 | 9/2001 | Johnson |

OTHER PUBLICATIONS

U.S. Appl. No. 08/885,415, filed Jun. 30, 1997, Acharya.
U.S. Appl. No. 09/008,131, filed Jan. 16, 1998, Acharya et al.
U.S. Appl. No. 09/018,601, filed Feb. 4, 1998, Acharya.
U.S. Appl. No. 09/034,625, filed Mar. 4, 1998, Acharya.
U.S. Appl. No. 09/163,022, filed Sep. 29, 1998, Acharya et al.
U.S. Appl. No. 08/978,786, filed Nov. 26, 1997, Acharya et al.
U.S. Appl. No. 09/482,551, filed Jan. 13, 2000, Acharya et al.
U.S. Appl. No. 08/963,525, filed Nov. 3, 1997, Acharya.
U.S. Appl. No. 09/482,552, filed Jan. 13, 2000, Acharya.
U.S. Appl. No. 08/114,720, filed Jul. 13, 1998, Acharya.
U.S. Appl. No. 09/050,743, filed Mar. 30, 1998, Acharya.
U.S. Appl. No. 08/986,761, filed Dec. 8, 1997, Acharya et al.
U.S. Appl. No. 09/154,176, filed Sep. 16, 1998, Acharya.
U.S. Appl. No. 08/963,334, filed Nov. 3, 1997, Acharya.
U.S. Appl. No. 08/986,461, filed Dec. 8, 1997, Acharya et al.
U.S. Appl. No. 09/258,636, filed Feb. 26, 1999, Acharya et al.
U.S. Appl. No. 09/048,901, filed Mar. 26, 1998, Acharya.
U.S. Appl. No. 09/040,806, filed Mar. 18, 1998, Acharya.
U.S. Appl. No. 09/301,753, filed Apr. 29, 1999, Acharya et al.
U.S. Appl. No. 09/083,383, filed May 21, 1998, Acharya et al.
U.S. Appl. No. 09/103,475, filed Jul. 2, 1998, Acharya et al.
U.S. Appl. No 09/140,517, filed Aug. 26, 1998, Acharya.
U.S. Appl. No. 09/129,728, filed Aug. 5, 1998, Acharya.
U.S. Appl. No. 09/146,159, filed Sep. 3, 1998, Acharya.
U.S. App. No. 09/152,703, filed Sep. 14, 1998, Acharya.
U.S. Appl. No. 09/207,753, filed Dec. 8, 1998, Acharya.
U.S. Appl. No. 09/272,751, filed Mar. 17, 1999, Acharya et al.
U.S. Appl. No. 09/1656,511, filed Oct. 2, 1998, Acharya et al.
U.S. Appl. No. 09/320,192, filed May 26, 1999, Acharya et al.
U.S. Appl. No. 09/211,309, filed Dec. 14, 1998, Acharya et al.
U.S. Appl. No. 09/438,091, filed Nov. 10, 1999, Acharya et al.
U.S. Appl. No. 09/342,863, filed Jun. 29, 1999, Acharya et al.
U.S. Appl. No. 09/191,310, filed Nov. 13, 1998, Acharya et al.
U.S. Appl. No. 09/383,117, filed Aug. 25, 1999, Acharya et al.
U.S. Appl. No. 09/291,810, filed Apr. 14, 1999, Acharya.
U.S. Appl. No. 09/292,763, filed Apr. 14, 1999, Acharya et al.
U.S. Appl. No. 09/390, 255, filed Sep. 3, 1999, Acharya et al.
U.S. Appl. No. 09/329,632, filed Jun. 10, 1999, Acharya et al.
U.S. Appl. No. 09/328,935, filed Jun. 9, 1999, Acharya et al.
U.S. Appl. No. 09/359,831, filed Jul. 23, 1999, Acharya et al.
U.S. Appl. No. 09/359,523, filed Jul. 23, 1999, Acharya et al.
U.S. Appl. No. 09/406,032, filed Sep. 27, 1999, Acharya.
U.S. Appl. No. 09/410,800, filed Oct. 1, 1999, Acharya et al.
U.S. Appl. No. 0/411,697, filed Oct. 1, 1999, Acharya.
U.S. Appl. No. 09/461,080, filed Dec. 14, 1999, Acharya.
U.S. Appl. No.09/461,068, filed Dec. 14, 1999, Acharya.
U.S. Appl. No. 09/432,337, filed Nov. 2, 1999, Acharya.
U.S. Appl. No. 09/429,058, filed Oct. 29, 1999, Acharya et al.
U.S. Appl. No. 09/467,487, filed Dec. 20, 1999, Acharya et al.
U.S. Appl. No. 09/467,611, filed Dec. 20,1999, Acharya et al.
U.S. Appl. No. 09/473,643, filed Dec. 28, 1999, Acharya et al.
U.S. Appl. No. 09/494,087, filed Jan. 28, 2000, Acharya.
U.S. Appl. No. 09/507,213, filed Feb. 25, 2000, Acharya et al.
U.S. Appl. No. 09/507,399, filed Feb. 25, 2000, Acharya et al.
U.S. Appl. No. 09/519,135, filed Mar. 6, 2000, Acharya et al.
U.S. Appl. No. 09/519,874, filed Mar. 6, 2000, Acharya et al.
U.S. Appl. No. 09/199,836, filed Nov. 24, 1998, Bawolek et al.
U.S. Appl. No. 09/155,336, filed Sep. 11, 1998, Pazmino et al.
U.S. Appl. No. 08/963,335, filed Nov. 3, 1997, Goldstein et al.
U.S. Appl. No. 08/963,097, filed Nov. 3, 1997, Booth, Jr. et al.
U.S. Appl. No. 09/126,203, filed Jul. 30, 1998, Bawolek et al.
U.S. Appl. No. 09/258,118, filed Feb. 24, 1999, Vavro et al.
U.S. Appl. No. 09/507,399, filed Feb. 18, 2000, Acharya et al.

Acharya et al., "A New Block Matching Based Color Interpolation Algorithm," Intel Corporation white paper, 3 pages.

Adams Jr., James E. Interactions between color plane interpolation and other image processing functions in electronic photography, SPIE, vol. 2416, pp. 144-151.

Pazmino, et al., "Method of Compressing and/or Decompressing a Data Set Using Significance Mapping", U.S. Appl. No. : 09/151,336, filed: Sep. 11, 1998, 25 Pgs.

Acharya, et al., "A Fuzzy Based Thresholding Technique for Image Segmentation", U.S. Appl. No. : 09/393,136, filed: Sep. 10, 1999, 28 Pgs.

Acharya, et al., "A Fuzzy Distinction Based Thresholding Technique for Image Segmentation", U.S. Appl. No. : 09/393,017, filed: Sep. 10, 1999, 29 Pgs.

Hai, et al., "Gibbs Random Fields, Fuzzy Clustering, and the Unsupervised Segmentation of Textured Images", Perception and Robotics Laboratory, Canada, Copy right 1993 by Academic Press Inc., pp. 1-19.

Jawahar, et al., "Techniques and Applications of Fuzzy Statistics in Digital Image Analysis", Fuzzy Theory Systems: Techniques and Applications, vol. 2, Copyright 1999 by Academic Press, pp. 759-778.

Pal, et al., "Image Segmentation Using Fuzzy Correlation", Elsevier Science Publishing Co., Inc. 1992, New York, NY, pp. 223-250.

Pal, et al., "Segmentation Based on Measures of Contrast Homogeneity, and Region Size", Transactions on System, Man, and Cybernetics, vol. SMC-17, No. 5, Sep./Oct. IEEE 1987, pp. 857-868.

Trivedi, et al., "Low-Level Segmentation of Aerial Images With Fuzzy Clustering", Tranactions on System, Man, and Cybernetics, vol. SMC-16, No. 4, Jul./Aug. 1986, IEEE, pp. 589-597.

Zimmermann, "Fuzzy Set Theory-and its Applications", Second, Revised Edition, Allied Publishers Limited, pp. 34-49.

Zhoa, et al., "A Fuzzy Logic Approach to Image Segmentation", 1994 IEEE, pp. 337-340.

Acharya, et al., "A New Block Matching Based Color Interpolation Algorithm", Intel Corporation, Digital Imaging and Video Division, Chandler, AZ, pp. 1-3.

Adams Jr., "Interactions Between Color Plane Interpolation and Other Image Processing Functions in Electronic Photography", Eastmann Kodak Company, Rochester, NY, SPIE vol. 2416, pp. 144-151.

"Image Processing and Machine Vision" Chapter 4, pp. 327-330.

Rosenfeld, "Fuzzy Digital Topology", Computer Science Center, University of Maryland, Inform. Control, vol. 40, No. 1, Copyright 1979 by Academic Press, Inc. pp. 331-339.

Rosenfeld, "The Fuzzy Geometry of Image Subsets", Pattern Recognition Letters, vol. 2, Sep. 1984, pp. 340-346.

Dyer, et al., "Thinning Algorithms for Gray-Scale Pictures", IEEE Trans. Pattern Anal. Machine Intel., vol. PAMI-1, No. 1, Jan. 1979, pp. 347-356.

Li, et al., "Fast and Reliable Image Enhancement Using Fuzzy Relaxation Technique", IEEE Trans. Syst. Man, Cybern., vol. SMC-19, No. 5, Sep./Oct. 1989, pp. 357-361.

Tanaka, et al., "A Study on Subjective Evaluations of Printed Color Images" Int'l J. Approximate Reasoning, vol. 5, No. 3, Copyright 1991 by Elsevier Science Publishing Company, Inc. pp. 362-368.

Pal, et al., "Image Enhancement and Thresholding by Optimization of Fuzzy Compactness", Pattern Recognition Letters, vol. 7, Feb. 1998, pp. 369-378.

Lim, et al., "On the Color Image Segmentation Algorithm Based on the Thresholding and the Fuzzy c-Means Techniques", Pattern Recognition, vol. 23, No. 9, Y.W. Lim and S.U. Lee, Copyright 1990, Pergamon Press Plc. pp. 379-396.

Huntsberger, et al., "Representation of Uncertainty in Computer Vision Using Fuzzy Sets", IEEE Trans. Comput., vol. C-35, No. 22, Feb. 1986, pp. 397-407.

* cited by examiner

| R | G1 | R | G1 | R | G1 | R | G1 | ... | ... |
|---|----|---|----|---|----|---|----|-----|-----|
| G2 | B | G2 | B | G2 | B | G2 | B | ... | ... |
| R | G1 | R | G1 | R | G1 | R | G1 | ... | |
| G2 | B | G2 | B | G2 | B | G2 | B | ... | |
| R | G1 | R | G1 | R | G1 | R | G1 | ... | |
| G2 | B | G2 | B | G2 | B | G2 | B | ... | |
| R | G1 | R | G1 | R | G1 | R | G1 | ... | |
| G2 | B | G2 | B | G2 | B | G2 | B | ... | |
| : | : | : | : | : | : | : | : | ... | |

Figure 1: Bayer Pattern

| | | $R_{m-2,n}$ | | |
|---|---|---|---|---|
| | | $G_{m-1,n}$ | | |
| $R_{m,n-2}$ | $G_{m,n-1}$ | $R_{m,n}$ | $G_{m,n+1}$ | $R_{m,n+2}$ |
| | | $G_{m+1,n}$ | | |
| | | $R_{m+2,n}$ | | |

Figure 2

| $B_{m-1,n-1}$ | $G_{m-1,n}$ | $B_{m-1,n+1}$ |
|---|---|---|
| $G_{m,n-1}$ | $R_{m,n}$ | $G_{m,n+1}$ |
| $B_{m+1,n-1}$ | $G_{m+1,n}$ | $R_{m+1,n+1}$ |

Figure 3

|  | $B_{m-1,n}$ |  |
|---|---|---|
| $R_{m,n-1}$ | $G_{m,n}$ | $R_{m,n+1}$ |
|  | $B_{m+1,n}$ |  |

Figure 4

METHOD OF USING HUE TO INTERPOLATE COLOR PIXEL SIGNALS

RELATED APPLICATION

This patent application is a continuation-in-part of U.S. patent application Ser. No. 09/410,800, titled "Method of Interpolation Color Pixel Signals from a Subsampled Color Image," by Acharya et al., filed on Oct. 1, 1999, assigned to the assignee of the present invention and herein incorporated by reference.

BACKGROUND

This disclosure is related to interpolating color pixel signal values for an image and, in particular, interpolating color pixel signal values using hue.

As is well-known, in a variety of circumstances, it is desirable to perform color interpolation. For example, for a camera or other imager that has the capability of creating a color image, typically it is too expensive to have the capability to capture three independent color pixel signal values for each pixel location of an image at least on part because this would employ additional sensors. Therefore, more typically, a subsampled color image is captured and then the missing color pixel signal values are computed using techniques of color interpolation. Most of the existing simple color interpolation techniques typically do not produce high-quality color images. Therefore, a need continues to exist for color interpolation techniques capable of producing quality color images from a subsampled color image.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1 is a schematic diagram illustrating a subsampled color image, such as a Bayer pattern color mage;

FIG. 2 is a schematic diagram illustrating a portion of a subsampled color image in which the color pixel signal values are to be employed by an embodiment of a method in accordance with the present invention;

FIG. 3 is a schematic diagram illustrating a portion of another subsampled color image in which the color pixel signal values are to be employed by an embodiment of a method in accordance with the present invention;

FIG. 4 is a schematic diagram illustrating yet another portion of a subsampled color image in which the color pixel signal values are to be employed by an embodiment of a method in accordance with the present invention.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

As previously indicated, in a variety of circumstances it may be desirable to have a capability to interpolate color pixel signals from a subsampled color image in order to recover the missing color components in a particular pixel location. FIG. 1 is a schematic diagram illustrating a Bayer pattern color image, which is one example of a subsampled color image, although the invention is not limited in scope in this respect. For example, many other well-known subsampled color images may be employed and will provide satisfactory results. As previously indicated, unfortunately, many color interpolation techniques typically do not produce high-quality color images at least in part because the techniques employed typically do not take into account, or at least reasonably correctly take into account, how the human eye perceives color. For example, a typical color interpolation technique may include averaging the pixels adjacent to a particular pixel location in which it is desired to interpolate the color signal value for those colors not included in that pixel location of a subsampled color image. However, typically, simply employing a pure average does not produce high quality results at least in part because it may blur the edge information and produce a color bleeding problem, for example.

In this particular embodiment of a method of using hue to interpolate color pixel signals in accordance with the present invention, color interpolation is accomplished by comparing, for a particular pixel location in a subsampled color image, relative differences in hue for two mutually orthogonal directions across the particular pixel location. Hue, in this context, for red and blue, refers to the relative signal value of a blue or red signal value to a green signal value at a given pixel location. It is assumed that if a significant change in hue occurs in a particular direction, the color pixel signal values in that direction are not as representative of the color pixel signal values at the particular pixel location as are the color pixel signal values from the mutually orthogonal direction. For example, it may be that in the image, an edge is being encountered. Therefore, in computing the color signal value for that particular pixel location, the change in hue for a direction that indicates less change in hue is weighed more heavily, in this particular embodiment. It is believed that this is more representative of how the human eye perceives color because the human vision system is more responsive to the relative change of color in neighboring pixels than to the color information in the pixel itself. In addition, as explained in more detail hereinafter, in computing pixel signal values for particular colors, the change in hue from both directions are weighed, instead of only using the change in hue from one direction to the exclusion of the other direction.

FIG. 2 is schematic diagram illustrating a portion of a five pixel-by-five pixel grid of the Bayer pattern of FIG. 1. As illustrated, the center pixel location comprises a red pixel signal value. Therefore, for this particular pixel location, it is desired to interpolate the missing color signal values, blue and green, for that pixel location from the surrounding pixel signal values. For example, a green pixel signal value may be estimated as follows. First, the relative change in hue for the horizontal direction and the vertical directions with respect to this particular pixel location, designated below as RCH_hor and RCH_ver, respectively, may be computed and compared. This is accomplished using the following equations.

$$RCH\_hor = |\tfrac{1}{2} \times [-R_{m,n-2} + 2G_{m,n-1} - 2G_{m,n+1} + R_{m,n+2}]|$$

$$RCH\_ver = |\tfrac{1}{2} \times [-R_{m-2,n} + 2G_{m-1,n} - 2G_{m+1,n} + R_{m+2,n}]| \qquad [1]$$

It is noted that for convenience, for the equations throughout the text of this specification, such as equations [1] above, it is assumed that the pixel signal values employed, such as $R_{i,j}$ or $G_{i,j}$, for example, are the logarithm of the pixel signal values having the corresponding designation from the sub-sampled image.

If the relative change in hue in the vertical direction is greater than the relative change in hue in the horizontal direction, then the values in the horizontal direction, that is, in this embodiment, the green and red pixel signal values that are the immediately adjacent pixel signal values in the horizontal direction, are weighed more heavily. In this embodiment, the weight assigned to these, 0.5 here, has been chosen based at least in part on fuzzy assignment concepts and experimentation, although the invention is not limited in scope in this respect. It is noted that other weights may be employed and provide satisfactory results. At the same time, the weights assigned to vertical signal values have been chosen as 0.1, although the invention is not limited in scope in this respect. On the basis of the above discussion, the missing green pixel signal values in this particular pixel location is estimated, in this embodiment, as $$G_{m,n}=[0.5*(Ihor)+0.1*(Iver)]/(0.5+0.1); \text{ or}$$

$$G_{m,n}=2[0.41667*(Ihor)+0.08333*(Iver)];$$

where $$Ihor=(G_{m-1,n}+G_{m+1,n})/2+0.5\times(-R_{m-2,n}+2R_{m,n}-R_{m+2,n})/4$$

$$Iver=(R_{m,n-1}+R_{m,n+1})/2+0.5\times(-R_{m,n-2}+2R_{m,n}-R_{m,n+2})/4 \quad [2]$$

If the relative change in hue in the horizontal direction is greater than the relative change in hue in the vertical direction, then a reverse approach is employed. More particularly, the pixel signal signal values in the alternate directions, in this particular embodiment, are weighed more heavily. In particular, the green pixel signal value in this particular pixel signal location for such a situation is estimated as follows.

$$G_{m,n}=2[0.08333*(Ihor)+0.41667*(Iver)];$$

It is noted that the form of this equation is similar to the form above, except that the vertical and horizontal pixel signal values that were computed are interchanged. Finally, if the two relative changes are equal, or substantially equal, then a simple average of Iver and Ihor are employed in this embodiment.

$$G_{m,n}=0.5*(Ihor+Iver);$$

Therefore, in order to compute the signal value for the green color plane, where the particular pixel location has a pixel signal value in the red color plane, the relative change in hue in mutually orthogonal directions is compared. It is noted that where the particular pixel location has a blue pixel signal value in the Bayer pattern shown in FIG. 1, the structure of a five pixel-by-five pixel portion of the sub-sampled color image is similar in arrangement to that illustrated in FIG. 2, except the center pixel contains blue signal information instead of red signal information. Therefore, for a pixel location containing a blue signal value, in this embodiment, the missing green pixel signal value for that pixel location may be estimated by using a technique essentially the same as one previously described, replacing the red pixel signal value used in the equations above for a particular location with the blue pixel signal value for the particular location now being considered.

FIG. 3 is schematic diagram of another portion of the Bayer pattern of FIG. 1. This three pixel-by-three pixel portion is similar to a three-by-three portion of FIG. 2, except that pixel signal values in the respective corners of the three-by-three array have also been provided. For this portion, it is desirable to interpolate a blue pixel signal value for the location in which a red pixel signal value is provided. However, as illustrated in FIG. 3, blue pixel signal values immediately adjacent to the red pixel signal value are provided in the corners. Therefore, in contrast with the approach just described, the two mutually orthogonal directions to be compared comprise the main diagonal and the secondary diagonal of the array of pixels. Therefore, the relative change in hue across these two diagonals shall be compared. Hue, in this context, for red and blue, refers to the relative signal value of a blue or red signal value to a green signal value at a given pixel location. As previously indicated, the reason this approach is employed is because it is believed that hue information more accurately reflects how the human eye perceives changes in color. Furthermore, a comparison for red and blue pixel signal values is made with green pixel signal values because, in Red-Green-Blue (RGB) color space format, the green plane includes a relatively larger amount of luminosity signal information compared to the red and blue planes. Hue for red or blue signal values, therefore, is estimated by comparison with the green value. Therefore, hue for the four blue pixel signal values is computed by comparing the blue pixel signal value in that location with the green pixel signal value in that location. It should be noted that the missing green pixel value has already been or may be recovered via the previous technique. Therefore, the following equations apply.

$$hue\_nw=B_{m-1,n-1}-G_{m-1,n-1};$$

$$hue\_sw=B_{m+1,n-1}-G_{m+1,n-1};$$

$$hue\_ne=B_{m-1,n+1}-G_{m-1,n+1};$$

$$hue\_se=B_{m+1,n+1}-G_{m+1,n+1}; \quad [3]$$

Then, the related change in hue along the main diagonal and the secondary diagonal may be computed as follows.

$$hue\_md=|hue\_nw-hue\_se|;$$

$$hue\_sd=|hue\_ne-hue\_sw|; \quad [4]$$

As discussed above, if the hue in any particular direction changes more significantly, then the hue in the mutually orthogonal direction is employed to estimate the blue pixel signal value in a particular pixel location. More accurately, that direction in which there is less relative change in hue is weighed more heavily than in the direction in which the relative change in hue is greater. Employing the relative change in hue in this fashion, the blue pixel signal value may be estimated as follows, assuming the relative relative change in hue along the main diagonal is less.

$$B_{m,n}=(G_{m,n})+0.41667*((B_{m-1,n-1}-G_{m-1,n-1})+(B_{m+1,n+1}-G_{m+1,n+1}))+0.08333*((B_{m-1,n+1}-G_{m-1,n+1})+(B_{m+1,n-1}-G_{m+1,n-1})); \quad [5]$$

Likewise, a similar equation is employed for the opposing diagonal, except that the signal values along the diagonals are interchanged, providing the following equation.

$$(B_{m,n})=(G_{m,n})+0.08333*((B_{m-1,n-1}-G_{m-1,n-1})+(B_{m+1,n+1}-G_{m+1,n+1}))+0.41667*((B_{m-1,n+1}-G_{m-1,n+1})+(B_{m+1,n-1}-G_{m+1,n-1})) \quad [6]$$

It is noted that interpolation of a red pixel signal value for a particular pixel location having a blue pixel signal value may be obtained using a similar approach except that in the above equation the blue pixel signal values are interchanged with red pixel signal values.

This is because, as illustrated in FIG. 1, where the particular pixel location has a blue pixel signal value, the pixel signal values in the four corners are red pixel signal values, providing substantially the same structure or array layout as illustrated in FIG. 3. Finally, a blue pixel signal value may be interpolated where a green pixel signal value is provided in the particular pixel location of the subsampled image, as illustrated in FIG. 4, for example. The approach is similar to that described in connection to the approach described with FIG. 3, except that, instead of employing the pixel signal values along the diagonals, the horizontal and vertical pixel signal values are employed using either horizontal or vertical pixel signal value directly available from the subsampled color image. The other pixel value in the orthogonal direction which is used for interpolation is obtained by employing the previous calculation. For example, the blue pixel signal values in the horizontal locations immediately adjacent the green pixel signal values in FIG. 4 are interpolated using the approach just described above in connection with FIG. 3. Therefore, the following equations are employed.

$$hue\_n = B_{m-1,n} - G_{m-1,n};$$

$$hue\_e = B_{m,n+1} - G_{m,n+1};$$

$$hue\_w = B_{m,n-1} - G_{m,n-1};$$

$$hue\_s = B_{m+1,n} - G_{m+1,n};$$

$$hhor = hue\_e - hue\_w;$$

$$hver = hue\_n - hue\_s, \qquad [7]$$

where $B_{m,n+1}$ and $B_{m,n-1}$ are obtained from the previous interpolation calculation.

If (|hhor|<|hver|) then $$(B_{m,n}) = (G_{m,n}) + 0.41667 * ((B_{m,n-1} - G_{m,n-1}) + (B_{m,n+1} - G_{m,n+1})) + 0.08333 * ((B_{m-1,n} - G_{m-1,n}) + (B_{m+1,n} - G_{m+1,n}))$$

else $$(B_{m,n}) = (G_{m,n}) + 0.08333 * ((B_{m,n-1} - G_{m,n-1}) + (B_{m,n+1} - G_{m,n+1})) + 0.41667 * ((B_{m-1,n} - G_{m-1,n}) + (B_{m+1,n} - G_{m+1,n}))$$

endif

A similar approach may be employed to interpolate the red pixel signal value where the particular pixel location of the subsampled image includes a green pixel signal value, except that in the equations provided above, the blue pixel signal values are replaced by red pixel signal values, as follows $$hue\_n = R_{m-1,n} - G_{m-1,n}$$

$$hue\_e = R_{m,n+1} - G_{m,n+1};$$

$$hue\_w = R_{m,n-1} - G_{m,n-1};$$

$$hue\_s = R_{m+1,n} - G_{m+1,n};$$

$$hhor = hue\_e - hue\_w;$$

$$hver = hue\_n - hue\_s, \qquad [8]$$

where $R_{m-1,n}$ and $R_{m+1,n}$ (or $R_{m,n-1}$ and $R_{m,n+1}$ depending on whether the particular pixel is located in the red-green row or blue-green row) are obtained from the previous interpolation calculation.

if (|hhor|<|hver|) then $$(R_{m,n}) = (G_{m,n}) + 0.41667 * ((R_{m,n-1} - G_{m,n-1}) + (R_{m,n+1} - G_{m,n+1})) + 0.08333 * ((R_{m-1,n} - G_{m-1,n}) + (R_{m+1,n} - G_{m+1,n})).$$

else $$(R_{m,n}) = (G_{m,n}) + 0.08333 * ((R_{m,n-1} - G_{m,n-1}) + (R_{m,n+1} - G_{m,n+1})) + 0.41667 * ((R_{m-1,n} - G_{m-1,n}) + (R_{m+1,n} - G_{m+1,n}))$$

endif

It will, of course, be appreciated that the invention is not restricted in scope to a particular embodiment or implementation. For example, the foregoing approach, as one example of an approach in accordance with the invention, may be implemented in hardware, in software, in firmware, and/or any combination thereof. Again, intended merely as examples that do not limit the scope of the invention, an embodiment may comprise an imager including hardware, such as integrated circuit chips, that implement the foregoing. Alternatively, the imager may be coupled to a computing platform that includes software capable of implementing the foregoing. Likewise, a digital camera coupled to a desktop personal computer, for example, may implement an embodiment. Furthermore, these implementations in hardware and software may, of course, deviate from the foregoing and still be within the scope of the present invention.

For embodiments that are at least partially implemented in software, such as, for example, the previously described embodiment, such software may reside on a storage medium, such as, for example, random access memory, a CD ROM, a floppy disk, or a hard drive, such that instructions are stored, which, when executed, such as by a computing platform, such as a PC or other computing device, so that the system is capable of executing the instructions to result in the interpolation of color pixel signal values from a subsampled image. Likewise, such software may reside in firmware also, such as in flash memory or EEPROM, for example.

While certain features of the invention have been illustrated and described herein, many modifications, substitutions, changes and equivalents will now occur to those skilled in the art. It is, therefore, to be understood that the appended claims are intended to cover all such modifications and changes as fall within the true spirit of the invention.

The invention claimed is:

1. A method of using hue to interpolate color pixel signal values comprising:
   for a particular pixel location in a subsampled image, comparing relative changes in hue for two mutually orthogonal directions across said particular pixel location; and
   computing a color signal value for that particular pixel location for a color plane other than the color plane of the pixel signal value in the subsampled color image at that location, the computation including relatively weighing the relative changes in hue, the relative weights depending, at least in part, on the difference in hue value in one particular direction relative to the other.

2. The method of claim 1, wherein computing a color signal includes relatively weighing the differences in hue by relatively weighing more heavily the difference in hue associated with the direction having a difference in hue less relatively for the particular pixel location.

3. The method of claim 2, wherein the subsampled image comprises an image in RGB color space format including an R plane, a G plane and a B plane.

4. The method of claim 3, wherein the subsampled color image comprises a Bayer pattern.

5. The method of claim 4, wherein the color plane of the pixel signal value at said particular pixel location comprises the R color plane;
   the two mutually orthogonal directions comprising the horizontal and vertical directions;
   the particular color plane for the color signal value being computed comprising the G plane.

6. The method of claim 4, wherein the color plane of the pixel signal value at said particular pixel location comprises the B color plane;
   the two mutually orthogonal directions comprising the horizontal and vertical direction; and
   the particular color plane for the color signal value being computed comprising the G plane.

7. The method of claim 4, wherein the color plane of the pixel signal value at said particular pixel location comprises the R color plane;
   the two mutually orthogonal directions comprising main diagonal and secondary diagonal directions;
   the particular color plane for the color signal value being computed comprising the B plane.

8. The method of claim 4, wherein the color plane of the pixel signal value at said particular pixel location comprises the B color plane;
   the two mutually orthogonal directions comprising main diagonal and secondary diagonal directions;
   the particular color plane for the color signal value being computed comprising the R plane.

9. The method of claim 4, wherein the color plane of the pixel signal value at said particular pixel location comprises the G color plane;
   the two mutually orthogonal directions comprising the horizontal and the vertical directions;
   the particular color plane for the color signal value being computed comprising the B plane.

10. The method of claim 4, wherein the color plane of the pixel signal value at said particular pixel location comprises the G color plane;
    the two mutually orthogonal directions comprising the horizontal and the vertical directions;
    the particular color plane for the color signal value being computed comprising the R plane.

11. A method of using hue to interpolate color pixel signal values comprising:
    for a particular pixel location in a subsampled image comprising an image in a Bayer pattern RGB color space format including an R Plane, a G plane and a B plane, comparing relative changes in hue for mutually orthogonal main diagonal and secondary diagonal directions across said particular pixel location; and
    computing a B plane color signal value for that particular pixel location in the R color plane of the subsampled color image, the computation including relatively weighing the relative changes in hue by, at least in part, relatively weighing more heavily the difference in hue associated with the direction having a difference in hue less relatively for the particular pixel location;
    wherein the interpolation of a blue pixel signal value at a green pixel location is based at least in part on computed B pixel signal value levels for red pixel locations adjacent said green pixel location and also on existing blue pixel locations adjacent said green pixel location in a mutually orthogonal direction to said adjacent red pixel locations in the subsampled color image.

12. A method of using hue to interpolate color pixel signal values comprising:
    for a particular pixel location in a B color plane of a subsampled image comprising a Bayer pattern in RGB color space format, comparing relative changes in hue for main diagonal and secondary diagonal directions across said particular pixel location; and
    computing an R color plane signal value for that particular pixel location by relatively weighing the relative changes in hue, the relative weights depending, at least in part, on the difference in hue value in one particular direction relative to the other;
    wherein computing a color signal includes relatively weighing the differences in hue by relatively weighing more heavily the difference in hue associated with the direction having a difference in hue less relatively for the particular pixel location; and
    wherein the interpolation of a red pixel signal value at a green pixel location is based at least in part on computed R pixel signal value levels for blue pixel locations adjacent said green pixel location and also on existing red pixel locations adjacent said green pixel location in a mutually orthogonal direction to said adjacent blue pixel locations in the subsampled color image.

13. An article comprising:
    a storage medium, having stored thereon instructions, which, when executed by a system capable of executing the instructions, result in interpolating color pixel signal values from a subsampled image by:
    for a particular pixel location in the subsampled image, comparing changes in hue for two mutually orthogonal directions across said particular pixel location; and
    computing a color signal value for that particular pixel location for a color plane other than the color plane of the pixel signal value in the subsampled color image at that location by relatively weighing the differences in hue, the relative weights depending, at least in part, on the difference in hue in a particular direction relative to the other direction.

14. The article of claim 13, wherein the instructions, when executed, further result in interpolating color pixel signal values from a subsampled image in RBG color space format.

15. The article of claim 13, wherein the instructions, when executed, further result in interpolating color pixel signal values from a Bayer pattern image.

16. An integrated circuit comprising;
    electronic circuitry adapted to process pixel signal values;
    wherein said electronic circuitry is further adapted to interpolate color pixel signal values from a subsampled image by:
    for a particular pixel location in the subsampled image, comparing changes in hue for two mutually orthogonal directions across said particular pixel location; and
    computing a color signal value for that particular pixel location for a color plane other than the color plane of the pixel signal value in the subsampled color image at that location by relatively weighing the differences in hue, the relative weights depending, at least in part, on the difference hue in a particular direction relative to the other direction.

17. The integrated circuit of claim 16, wherein said electronic circuitry is further adapted to interpolate color pixel signal values from a subsampled image in RBG color space format.

18. The integrated circuit of claim 16, wherein said electronic circuitry is further adapted to interpolate color pixel signal values from a Bayer pattern image.

19. A system comprising;

a computing platform adapted to process pixel signal values;

wherein said computing platform is further adapted to interpolate color pixel signal values from a subsampled image by:

for a particular pixel location in the subsampled image, comparing differences in hue for two mutually orthogonal directions across said particular pixel location; and computing a color signal value for that particular pixel location for a color plane other than the color plane of the pixel signal value in the subsampled color image at that location by relatively weighing the difference in hue, the relative weights depending, at least in part, on the difference in hue in a particular direction relative to the other direction.

20. The system of claim 19, wherein said computing platform is further adapted to interpolate color pixel signal values from a subsampled image in RBG color space format.

* * * * *